United States Patent [19]

Weyer

[11] Patent Number: 4,699,353
[45] Date of Patent: Oct. 13, 1987

[54] ROTARY VALVE ACTUATOR

[76] Inventor: Paul P. Weyer, 48811 284th SE., Enumclaw, Wash. 98022

[21] Appl. No.: 948,318

[22] Filed: Dec. 31, 1986

[51] Int. Cl.$^4$ .............................................. F16K 51/00
[52] U.S. Cl. .......................................... 251/60; 92/33; 251/288; 285/406; 403/338
[58] Field of Search .......................... 251/59, 60, 288; 92/13.41, 2, 59, 33, 161; 285/405, 406, 412; 403/335, 337, 338

[56] References Cited

U.S. PATENT DOCUMENTS

| | | | |
|---|---|---|---|
| 3,107,546 | 10/1963 | Rowland | 251/288 X |
| 3,190,188 | 6/1965 | Donnelly | 92/161 X |
| 3,981,409 | 9/1976 | Flanders | 285/406 X |
| 4,313,367 | 2/1982 | Weyer | 92/33 |
| 4,545,289 | 10/1985 | Weyer | 92/33 |

FOREIGN PATENT DOCUMENTS

| | | | |
|---|---|---|---|
| 277680 | 1/1970 | Fed. Rep. of Germany | 285/405 |
| 67611 | 7/1929 | Sweden | 403/337 |

Primary Examiner—Martin P. Schwadron
Assistant Examiner—Stephen M. Hepperle
Attorney, Agent, or Firm—Seed and Berry

[57] ABSTRACT

A valve actuator for providing rotational drive to a valve through a valve stem, where the valve includes a flange with attachment bolt holes for attachment of the actuator thereto using bolts. The actuator has an outer body having a sidewall and a base end position toward the valve flange, a rotatable output drive member accessible from the base end and adapted for coupling to the valve stem and having rotational end limits, and an attachment base fixedly attached to the body toward the base end and having a base flange and an attachment lip. The lip is attached to the base flange and is spaced apart from the body sidewall to define an annular space therebetween. A plurality of clips are positioned about the lip to secure the body to the valve flange while allowing selective rotation of the body to adjustably set the rotational end limits of the output drive member relative to the valve. The clips each include a body having an aperture for an attachment bolt and an arm extending laterally inward over the lip with a finger projecting into the annular space. The clip further includes a pair of set screws which are adjustably extendable to grasp the lip between the set screws and finger.

8 Claims, 4 Drawing Figures

ROTARY VALVE ACTUATOR

DESCRIPTION

1. Technical Field

The present invention relates generally to valve actuators, and more particularly, to rotary valve actuators of the type in which linear movement of a piston produces rotary movement of an output shaft which is coupled to a valve stem.

2. Background Art

Rotary helical actuators have been employed in the past and offer the advantages of high-torque output from a simple linear piston and cylinder drive arrangement. One such actuator is shown in U.S. Pat. No. 4,313,367. A shortcoming of such actuators, however, is that when the actuator is fixedly mounted to a valve flange and the rotary motion on the outptut shaft is used to rotate a valve stem in a fluid control valve, the rotational end limits of travel of the output shaft may not correspond precisely with the desired valve stem rotational end limits. Limiting the rotation is critical to avoid the actuator providing too little drive in one direction or the other so that a fully open or closed valve position is not achieved, or driving the valve beyond its normal positions of fully open or fully closed. In some valves, over driving the valve can cause valve damage.

In an attempt to overcome this shortcoming, rotary helical actuators have been provided with means to limit the amount of rotation of the output shaft within precise preselected and adjustable limits. One such actuator is shown in U.S. Pat. No. 4,545,289. While this actuator allows selection of the rotational end limits of the actuator output shaft to correspond to the range of positions between fully open and fully closed for the valve stem, it has certain drawbacks. Once the actuator is mounted to valve flange, the entire discrepancy between the rotational end limits of the actuator and the valve stem must be taken up by an adjustment which restricts the linear travel of the actuator piston sleeve. In some situations, undue restriction of the actuator piston sleeve would be required to match the rotational end limits of the actuator and valve stem. To provide for adjustment of the piston sleeve travel also has the drawback of requiring a more complicated internal actuator design.

An additional problem with conventional valve actuators has been that the base flange used to attach the actuator to the valve flange must closely match the valve flange, or else the mounting bolt holes will not align. Since the actuator base flange is usually formed as an integral portion of the actuator body, this meant that no single actuator could be built to serve as a universal valve actuator easily mountable on a wide variety of valve flanges. The actuator body needed to have a base flange with the number and position of its mounting bolt holes specifically designed for the particular valve flange with which the actuator was destined to be used.

As such, the need for a special design increased cost, increased the inventory of actuators required for users having systems with several valve flange configurations, prevented the interchange of actuators unless they happened to be specifically built to be mounted on the same configuration valve flanges, and required repairmen travelling in the field for on location repair or possible replacement to know in advance which design valve flange was involved to be able to have on hand a valve actuator with a compatible base flange. As with inventories, this required the repairmen to carry one or more actuators of every type flange when fewer actuators were really needed.

The present invention overcomes these shortcomings and problems, and provides other related advantages.

DISCLOSURE OF THE INVENTION

A valve actuator for providing rotational drive to a valve through a valve stem, where the valve includes a flange with attachment bolt holes for attachment of the actuator thereto using bolts. The actuator has an outer body having a sidewall and a base end positionable toward the valve flange. A rotary output drive member is accessible from the body base end and is adapted for coupling to the valve stem to provide rotational drive thereto. The output drive member has rotational end limits of travel. The actuator further has an attachment base fixedly attached to the body toward the base end and having a base flange and an attachment lip.

The base flange extends laterally away from the body sidewall and is mountable in juxtaposition with the valve flange. The lip is attached to the base flange and projects generally away from the valve flange. The lip extends at least partially around the perimeter of the body sidewall and is spaced apart from the body sidewall to define a space therebetween opening in a direction generally away from the valve flange.

The actuator further includes at least one clip positioned for securely attaching the body to the valve flange while allowing selective rotation of the body to adjustably set the rotational end limits of the output drive member relative to the valve. The clip has a body and an arm. The clip body is positionable laterally outward of the lip and has an aperture therethrough for alignment with one of the bolt holes in the valve flange. The aperture is sized for receiving one of the bolts for attachment of the clip body to the valve flange against movement.

The clip arm is attached to the clip body toward an end thereof positioned away from the valve flange at a distance sufficient to extend over an end portion of the lip. The clip arm extends from the clip body laterally inward toward the body sidewall and has a finger projecting into the space between the lip and the body sidewall. The finger is positioned for engagement with a laterally inward wall of the lip. The finger is disconnected from the lip and the space is unobstructed along a sufficiently long portion thereof extending around the perimeter of the body sidewall to permit uninhibited adjustable rotation of the body relative to the valve for setting the rotational end limits of the output drive member.

In a preferred embodiment of the invention, the finger projects sufficiently into the space to frictionally engage the base flange, and the clip body has a length in the direction extending toward the valve flange when the finger is engaged with the base flange to provide an adjustment space between an end face of the clip body toward the valve flange and the valve flange. In such manner, when the attachment bolt is tightened, the clip finger is driven into frictional engagement with the base flange for holding the base flange in frictional engagement against the valve flange to prevent rotation of the body relative to the valve during fluid powered operation of the actuator.

The actuator further includes at least one engagement member extending through an inward wall of the clip body toward the lip and being adjustably extendable toward the lip to lockably grasp the lip between the engagement member and the finger for preventing rotational movement of the body on the valve flange during fluid powered operation of the actuator. In the preferred embodiment, the engagement member includes a pair of set screws. After the rotational end limits of the output drive member as set by rotation of the body relative to the valve, the attachment bolt in the clip body aperture can be tightened to securely attach the clip body to the valve flange and the engagement member can be extended to grasp the lip between the engagement member and the finger. As such, rotation of the body relative to the valve is prevented during fluid powered operation of the actuator.

Other features and advantages of the invention will become apparent from the following detailed description, taken in conjunction with the accompanying drawings.

BEST MODE FOR CARRYING OUT THE INVENTION

Figure 1:
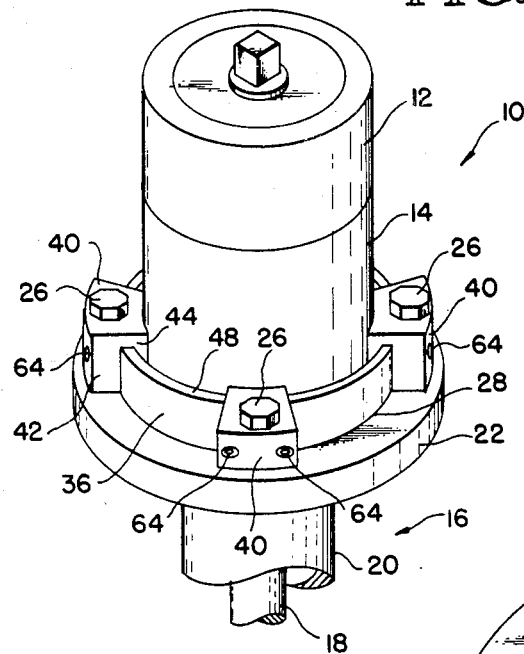
FIG. 1 is an isometric view of a rotary actuator embodying the present invention mounted on a valve.
Figure 3:
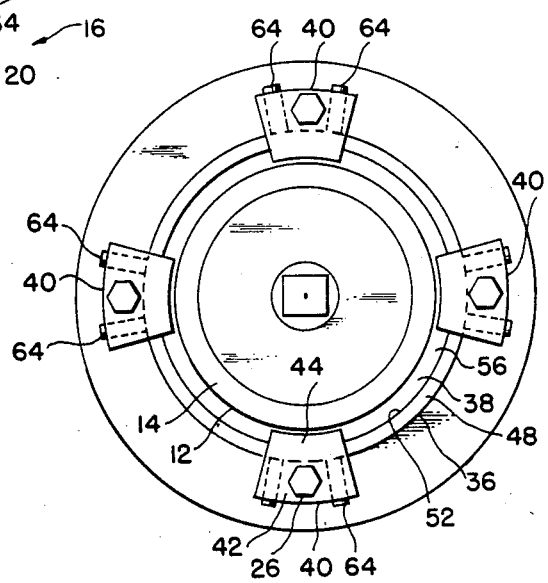
FIG. 3 is an enlarged, partially sectional, side elevational view of the rotary actuator shown in FIG. 1.
Figure 2:
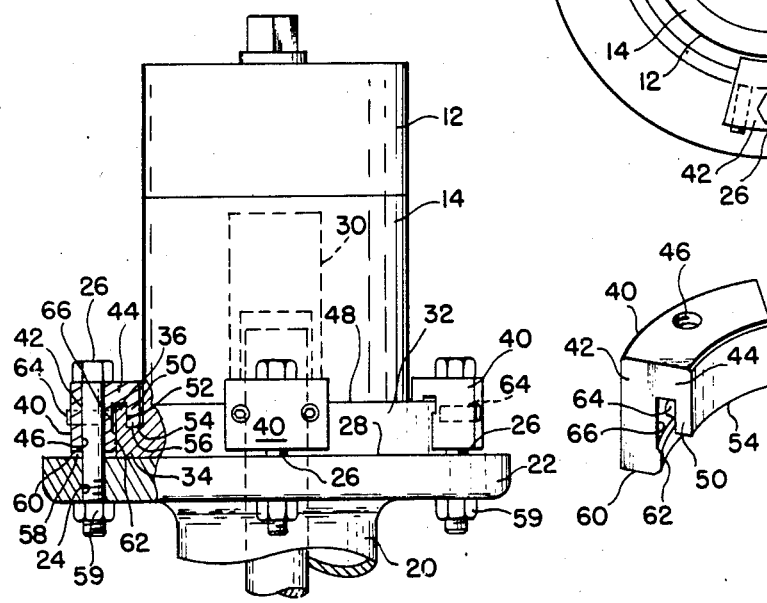
FIG. 2 is an enlarged top plan view of the rotary actuator shown in FIG. 1.
Figure 4:
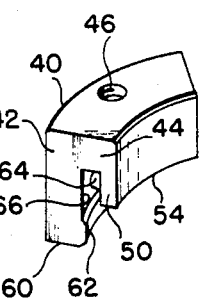
FIG. 4 is an isometric view of a clip used in the present invention separated from the actuator body.

As shown in the drawing for purposes of illustration, the present invention is embodied in a rotary valve actuator, indicated generally by reference numeral 10. The actuator 10 includes a body or housing 12 having a cylindrical sidewall 14. The actuator provides rotational drive to a valve 16 through a valve stem 18. The valve 16 is only partially shown in the drawings as the valve stem 18, a valve neck 20 and a valve mounting flange 22. The mounting flange 22 includes a plurality of attachment bolt holes 24 circumferentially spaced apart around the perimeter of the valve flange for attachment of the actuator 10 thereto using bolts 26. With the present invention, the actuator 10 can serve as a universal valve actuator mountable to valve mounting flanges 22 having various mounting bolt hole configurations requiring different numbers of bolt holes and varying circumferential placement of the bolt holes.

The body 12 is generally cylindrical in shape with a cylindrical sidewall 14, and has a base end 28 positionable toward the valve flange 22. The actuator 10 includes a rotary output drive member 30. With the particular actuator shown in the drawings, the output drive member 30 is recessed within the body 12 and adapted for coupling to the valve stem 18. The valve stem 18 projects outward beyond the valve flange 22 and inward of the actuator body 14 to receive rotational drive from the drive member.

The actuator 10 may have any of several designs which produce rotary output, such as a simple linear piston and cylinder drive arrangement using a piston sleeve disposed within the body 12 between the body and an output drive shaft coaxially and rotatably mounted within the body. A piston sleeve may be provided with a sleeve portion splined to cooperate with the corresponding splines on the body interior and the output shaft exterior. The piston sleeve is reciprocally mounted within the body and has a head for the application of fluid pressure to one or the other opposing sides thereof to produce axial movement of the piston sleeve. As the piston sleeve linearly reciprocates in an axial direction within the body, the outer splines of the sleeve portion engage the splines of the body to cause rotation of the sleeve portion. The resulting linear and rotational movement of the sleeve portion is transmitted through the innersplines of the sleeve portion to the splines of the shaft to cause the shaft to rotate. Such an actuator is shown in U.S. Pat. No. 4,545,289. While splines have been described, the actuator may use balls and ball races, or screw or circumferentially ringed rollers.

With this arrangement, the output drive shaft which serves as the output drive member 30 has clockwise and counterclockwise rotational end limits which result from the end limits of axial travel of the piston sleeve within the body. It should be understood that while a particular form of actuator drive is described, the principal of the invention is equally applicable to any form of linear to rotary motion conversion means or any other means which produces a rotary output having rotational end limits.

The actuator 10 includes an integrally formed attachment base 32 fixedly attached to the body 12 at its base end 28. The attachment base 32 includes a radially outward extending circular base flange 34 extending laterally outward from the body sidewall 14 and mountable in juxtaposition with the valve flange 22. The attachment base also includes a circular attachment lip 36 fixedly attached to the base flange 39 and projecting in a direction away from the valve flange 22. The lip 36 extends fully around the perimeter of the body sidewall 14 and is spaced apart from the body sidewall in the laterally outward direction to define an annular space 38 between the lip and the body sidewall. The space 38 opens in a direction away from the valve flange 22.

The actuator 10 includes four clips 40 in circumferentially spaced apart positions around the perimeter of the body sidewall 14 for securely attaching the body 12 to the valve flange 22 while allowing selective rotation of the body to adjustably set the rotational end limits of the output drive member 30 relative to the valve 16. Each of the clips 40 includes a clip body 42 and a clip arm 44 formed as an integral unit. The clip body 42 is positioned laterally outward of the lip 36 and adjacent thereto. The clip body 42 has an aperture 46 therethrough for alignment with the attachment bolt holes 24 in the valve flange 22. The aperture 46 is sized to receive one of the bolts 26 for attachment of the clip body to the valve flange against movement.

The clip arm 44 is fixedly attached to the clip body toward an end portion thereof positioned away from the valve flange 22 at a distance sufficient to extend over an end wall 48 of the lip 36. The clip arm 44 extends from the clip body 42 laterally inward toward the body sidewall 14 and has a finger 50 which projects into the space 38 between the lip 36 and the body sidewall. The finger 50 is positioned for engagement with a laterally inward wall 52 of the lip 36. The finger 50 projects sufficiently into the space 38 to position an end wall 54 of the finger in frictional engagement with an annular wall portion 56 of the base flange 34 defining the one closed side of the space 38.

The clip body 42 has a length in the direction extending toward the valve flange 22 such that when the end wall 54 of the finger 50 is engaged with the base flange wall portion 56 there is provided an adjustment space 58 between an end face 60 of the clip body 42 toward the valve flange 22 and the valve flange. This adjustment space 58 provides the clearance between the clip body 42 and the valve flange 22 necessary for tightening of nuts 59 threadably mounted on the bolts 26 to pull the end wall 54 of the finger 50 into tight engagement with the wall portion 56 of the base flange 34. It is noted that the finger 50 has a length sufficient such that when the bolt 26 is tightened, the clip arm 44 does not come into engagement with the upper wall 48 of the lip 36. To keep a proper orientation of the clip 40 relative to the actuator body 12, the clip body 42 includes an embossment 62 positioned to engage the laterally outward circumferential wall of the base flange 34 adjacent to the lip 36.

With this arrangement, the actuator 10 can be placed upon the valve flange 22 with the outptut drive member 30 coupled to the valve stem 18, with the clips 40 in place and the bolts 26 loosely tightened. The actuator 10 can then be rotated sufficiently so that the end limits of travel of the outptut drive member 30 correspond with the fully opened and fully closed rotational end limits of the valve stem. In practice, this could be accomplished by rotating the valve stem 18 sufficiently to the fully closed position and driving the actuator 10 until the output drive member 30 is also rotated to its rotational end limit corresponding to the closed valve position. The actuator can then be mounted upon the valve flange and the bolts 26 partially tightened. Rotation of the actuator on the valve flange is then possible to make a final alignment of the rotational end limits of the output drive member 30 with the rotational end limits of the valve stem 18. The bolts 26 then can be fully tightened to apply the desired clamping force of the actuator attachment base 32 to the valve mounting flange 22, and the set screws 64 tightened against the lip 36 with the finger 50 providing the needed reactionary force.

To permit the adjustable rotation of the actuator after mounted on the valve flange and before final tightening of the bolts 26, the space 38 between the lip 36 and the body sidewall 14 is unobstructed along a sufficiently long portion thereof extending around the perimeter of the body sidewall to permit substantially uninhibited rotation of the body 12 relative to the fingers 50, and hence the valve 16. It is noted that with the present invention, while the clips 40 must be aligned with the bolt holes 24 in the valve flange 22, the rotational position of the actuator body 12 on the valve flange is unrestricted and can be rotated as much as necessary to set the rotational end limits of the output drive member 30 to the end limits of the valve stem 18.

Each clip 40 includes a pair of set screws 64 with one set screw positioned to each side of the clip body aperture 46 and extending through an inward wall 66 of the clip body 42 toward the lip 36. The set screws 64 are adjustably extendable toward the lip 36 to grasp the lip tightly between the set screws and the finger 50 to assist in preventing rotational movement of the body 12 on the valve flange 22 during fluid powered operation of the actuator 10. As noted above, when the bolts 26 are fully tightened, the end wall 54 of the finger 50 is also brought into engagement with the annular wall portion 56 of the base flange 34, and as such, provides a downward force on the base flange 34 to hold it in tight frictional engagement with the valve flange 22. The coefficient of friction between the base flange 34 and the valve flange 22 under the downward pressure applied by the bolts 26 provides a force which also assists in preventing rotational movement of the body 12 on the valve flange during powered operation of the actuator 10.

Of course, an equal reactionary force is provided on the fingers 50 holding the base flange 34 to the valve flange 22, and is distributed substantially equal over the four fingers. This force and the coefficient of friction between the end walls 54 of the fingers 50 and the annular wall portion 56 of the base flange 34 also provides a force which assists in preventing rotation of the body 12 on the valve flange 22.

While the embodiment of the invention described utilizes four clips 40 spaced 90° apart, fewer clips can be used if sufficient to hold the actuator body in place under the torque produced by the actuator during powered operation. Additional clips can be used if necessary with valve flanges having additional bolt holes 24. Of course, the more clips utilized, the larger the force provided to hold the actuator in position against the torque generated during powered operation.

In situations where the shear force applied on the bolts 26 through the clips 40 by the actuator's operation is sufficiently large that shearing of the bolts is of concern, the clip body 42 can be provided with one or more additional apertures (not shown) in parallel with the bolt aperture 46 to receive dowel pins (not shown) which extend through the clip body into correspondingly positioned apertures formed in the valve flange 22. In addition, supplemental clips can be utilized without using bolts 26 where no additional bolt holes are available in the valve flange 22 and only using dowels. These dowel connected clips can be positioned between the clips secured to the valve flange with bolts. As such, large torque actuators can be mounted to a valve flange which may not have a sufficient number of bolt holes 24 by simply adding additional clips attached to the lip 36 by the set screws 64, and then pinning the clips to the valve flange using dowels to provide protection against shear. With the present invention, not only do the clips prevent rotation of the actuator body 12 on the valve flange 22, the clips also prevent the lifting of the body away from the valve flange.

It will be appreciated that, although specific embodiments of the invention have been described herein for purposes of illustration, various modifications may be made without departing from the spirit and scope of the invention. Accordingly, the invention is not limited except as by the appended claims.

I claim:

1. A valve actuator for providing rotational drive to a valve through a valve stem, where the valve includes a flange with attachment bolt holes for attachment of the actuator thereto using bolts, comprising:
   an outer body having a sidewall and a base end positionable toward the valve flange;
   a rotary output drive member accessible from said body base end and adapted for coupling to the valve stem to provide rotational drive thereto, said output drive member having rotational end limits;
   an attachment base fixedly attached to said body toward said base end and having a base flange and a generally circular attachment lip, said base flange extending laterally outward from said body sidewall and being mountable in juxtaposition with the valve flange, and said lip being fixedly attached to said base flange and projecting generally away from the valve flange, said lip extending fully around the perimeter of said body sidewall and being spaced apart from said body sidewall to define a space therebetween opening in a direction generally away from the valve flange; and a plurality of clips in spaced apart position around the perimeter of said body sidewall for securely attaching said body to the valve flange while allowing selective rotation of said body to adjustably set the rotational end limits of said output drive member relative to the valve, each clip including a clip body and a clip arm, said clip body being positionable laterally outward of said lip and adjacent thereto, and having an aperture therethrough for alignment with one of the attachment bolt holes in the valve flange, said aperture being sized for receiving one of the bolts for attachment of said clip body to the valve flange against movement, said clip arm being attached to said clip body toward an end portion thereof positioned away from the valve flange at a distance sufficient to extend over an end wall of said lip, said clip arm extending from said clip body laterally inward toward said body sidewall and having a finger projecting into said space between said lip and said body sidewall and positioned for engagement with a laterally inward wall of said lip, said finger projecting sufficiently into said space to frictionally engage said base flange, said finger being disconnected from said lip and base flange, said space being unobstructed along a sufficiently long portion thereof extending around the perimeter of said body sidewall to permit substantially uninhibited adjustable rotation of said body relative to the valve for setting the rotational end limits of said output drive member, said clip body having a length in the direction extending toward the valve flange when said finger is engaged with said base flange to provide an adjustment space between an end face of said clip body toward said valve flange and said valve flange, said clip body further including a pair of set screws with one positioned to each side of said clip body aperture, said set screws extending through an inward wall of said clip body toward said lip and being adjustably extendable toward said lip to grasp said lip between said set screws and said finger for preventing rotational movement of said body on the valve flange during powered operation of the actuator, whereby after the rotational end limits of said output drive member are set by rotation of said body relative to the valve, the attachment bolt in said clip body aperture can be tightened to drive said clip finger into frictional engagement with said base flange and said set screws can be extended to grasp said lip between said set screws and said finger for holding said base flange in frictional engagement against the valve flange and preventing rotation of said body relative to the valve during powered operation of the actuator.

2. A valve actuator for providing rotational drive to a valve through a valve stem, where the valve includes a flange with attachment bolt holes for attachment of the actuator thereto using bolts, comprising:

an outer body having a sidewall and a base end positionable toward the valve flange;

a rotary output drive member accessible from said body base end and adapted for coupling to the valve stem to provide rotational drive thereto, said output drive member having rotational end limits;

an attachment base fixedly attached to said body toward said base end and having a base flange and an attachment lip, said base flange extending laterally outward from said body sidewall and being mountable in juxtaposition with the valve flange, and said lip being attached to said base flange and projecting generally away from the valve flange, said lip extending at least partially around the perimeter of said body sidewall and being spaced apart from said body sidewall to define a space therebetween opening in a direction generally away from the valve flange; and at least one clip positioned for securely attaching said body to the valve flange while allowing selective rotation of said body to adjustably set the rotational end limits of said output drive member relative to the valve, said clip including a clip body and a clip arm, said clip body being positionable laterally outward of said lip and having an aperture therethrough for alignment with one of the attachment bolt holes in the valve flange, said aperture being sized for receiving one of the bolts for attachment of said clip body to the valve flange against movement, said clip arm being attached to said clip body toward an end portion thereof positioned away from the valve flange at a distance sufficient to extend over an end portion of said lip, said clip arm extending from said clip body laterally inward toward said body sidewall and having a finger projecting into said space between said lip and said body sidewall and positioned for engagement with a laterally inward wall of said lip, said finger being disconnected from said lip and said space being unobstructed along a sufficiently long portion thereof extending around the perimeter of said body sidewall to permit uninhibited adjustable rotation of said body relative to the valve for setting the rotational end limits of said output drive member, said clip body further including at least one engagement member extending through an inward wall of said clip body toward said lip and being adjustably extendable toward said lip to lockably grasp said lip between said engagement member and said finger for preventing rotational movement of said body on the valve flange during powered operation of the actuator, whereby after the rotational end limits of said output drive member are set by rotation of said body relative to the valve, the attachment bolt in said clip body aperture can be tightened to securely attach said body to the valve flange and said engagement member can be extended to grasp said lip between said engagement member and said finger, thereby preventing rotation of said body relative to the valve during powered operation of the actuator.

3. The actuator of claim 2 wherein said finger projects sufficiently into said space between said lip and said body sidewall to engage said base flange and apply a force to hold said base flange in frictional engagement against the valve flange when the attachment bolt is tightened.

4. The actuator of claim 3 wherein said clip body has a length in the direction extending toward the valve flange when said finger is engaged with said base flange to provide an adjustment space between an end face of said clip body toward said valve flange and said valve flange.

5. A valve actuator for providing rotational drive to a valve through a valve stem, where the valve includes a flange with attachment bolt holes for attachment of the actuator thereto using bolts, comprising:

an outer body having a sidewall and a base end positionable toward the valve flange;

a rotary output drive member accessible from said body base end and adapted for coupling to the valve stem to provide rotational drive thereto, said output drive member having rotational end limits;

an attachment base fixedly attached to said body toward said base end and having a base flange and an attachment lip, said base flange extending laterally outward from said body sidewall and being mountable in juxtaposition with the valve flange, and said lip being attached to said base flange and projecting generally away from the valve flange, said lip extending at least partially around the perimeter of said body sidewall and being spaced apart from said body sidewall to define a space therebetween opening in a direction generally away from the valve flange; and a plurality of clips positioned around the perimeter of said body sidewall for securely attaching said body to the valve flange while allowing selective rotation of said body to adjustably set the rotational end limits of said output drive member relative to the valve, each clip including a clip body and a clip arm, said clip body being positionable laterally outward of said lip and adjacent thereto, and having an aperture therethrough for alignment with one of the attachment bolt holes in the valve flange, said aperture being sized for receiving one of the bolts for attachment of said clip body to the valve flange against movement, said clip arm extending from said clip body laterally inward toward said body sidewall and having a finger projecting into said space between said lip and said body sidewall and positioned for engagement with a laterally inward wall of said lip, said finger being disconnected from said lip and base flange, said space being unobstructed along a sufficiently long portion thereof extending around the perimeter of said body sidewall to permit substantially uninhibited adjustable rotation of said body relative to the valve for setting the rotational end limits of said output drive member, said clip body further including a set screw adjustably extendable toward said lip to grasp said lip between said set screw and said finger for preventing rotational movement of said body on the valve flange during powered operation of the actuator.

6. A valve actuator for providing rotational drive to a valve through a valve stem, where the valve includes a flange with attachment bolt holes for attachment of the actuator thereto using bolts, the actuator being adapted for use with clips for securely attaching the actuator to the valve flange while allowing selective rotation of the actuator to adjustably set the rotational end limits thereof relative to the valve, each clip including a clip body and a clip arm having a finger, and including a set screw extending through an inward wall of said clip body and adjustably extendable toward the finger, the clip body having an aperture therethrough for alignment with one of the attachment bolt holes in the valve flange, the aperture being sized for receiving one of the bolts for attachment of the clip body to the valve flange against movement, the actuator comprising:

an outer body having a sidewall and a base end positionable toward the valve flange;

a rotary output drive member accessible from said body base end and adapted for coupling to the valve stem to provide rotational drive thereto, said output drive member having rotational end limits; and an attachment base fixedly attached to said body toward said base end and having a base flange and an attachment lip, said base flange extending laterally outward from said body sidewall and being mountable in juxtaposition with the valve flange, and said lip being attached to said base flange and projecting generally away from the valve flange, said lip extending at least partially around the perimeter of said body sidewall and being spaced apart from said body sidewall to define a space therebetween opening in a direction generally away from the valve flange, said lip having a height permitting the clip arm to extend from the clip body over an end wall of said lip and laterally inward toward said body sidewall so that the finger can be positioned in said space between said lip and said body sidewall and in engagement with a laterally inward wall of said lip, said space being unobstructed along a sufficiently long portion thereof extending around the perimeter of said body sidewall to permit substantially uninhibited adjustable rotation of said body relative to the valve for setting the rotational end limits of said output drive member, whereby after the rotational end limits of said output drive member are set by rotation of said body relative to the valve, the attachment bolt in the clip body aperture can be tightened and the set screw extended to grasp said lip between the set screw and the finger to prevent rotation of said body relative to the valve during powered operation of the actuator.

7. A clip for use with a valve actuator which provides rotational drive to a valve through a valve stem, where the valve includes a flange with attachment bolt holes for attachment of the actuator thereto using bolts, the actuator having an outer body with a sidewall and a base end positionable toward the valve flange, a rotary output drive member accessible from the body base end and adapted for coupling to the valve stem to provide rotational drive thereto, the output drive member having rotational end limits, and an attachment base fixedly attached to the body toward the base end and having a base flange and an attachment lip, the base flange extending laterally outward from the body sidewall and being mountable in juxtaposition with the valve flange, and the lip being attached to the base flange and projecting generally away from the valve flange, the lip extending at least partially around the perimeter of the body sidewall and being spaced apart from the body sidewall to define a space therebetween opening in a direction generally away from the valve flange, the clip comprising:

a clip body and a clip arm attached thereto, said clip body being positionable laterally outward of the lip and adjacent thereto, and having an aperture therethrough for alignment with one of the attachment bolt holes in the valve flange, said aperture being sized for receiving one of the bolts for attachment of said clip body to the valve flange against movement, said clip arm being attached to said clip body toward an end portion thereof positioned away from the valve flange at a distance sufficient to extend over an end portion of the lip, said clip arm extending from said clip body laterally inward toward the body sidewall and having a finger projecting into the space between the lip and the body sidewall and positioned for engagement with a laterally inward wall of the lip, said finger being disconnected from the lip to permit substantially uninhibited adjustable rotation of the body relative to the valve for setting the rotational end limits of the output drive member, said clip body further including at least one engagement member extending through an inward wall of said clip body toward the lip and being adjustably extendable toward the lip to lockably grasp the lip between said engagement member and said finger for preventing rotational movement of the body on the valve flange during powered operation of the actuator, said clip being usable to securely attach the body to the valve flange while allowing selective rotation of the body to adjustably set the rotational end limits of the output drive member relative to the valve, whereby after the rotational end limits of the output drive member are set by rotation of the body relative to the valve, the attachment bolt in said clip body aperture can be tightened to securely attach the body to the valve flange and said engagement member can be extended to grasp said lip between said engagement member and said finger, thereby preventing rotation of the body relative to the valve during powered operation of the actuator.

8. A method for securely attaching a valve actuator to a valve flange, where the valve actuator provides rotational drive to a valve through a valve stem, the valve flange using attachment bolt holes for attachment of the actuator thereto using bolts, comprising:

providing an actuator with an outer body having a sidewall, a base end positionable toward the valve flange, and a rotary output drive member accessible from said body base end and adapted for coupling to the valve stem to provide rotational drive thereto, said output drive member having rotational end limits, and further providing said actuator with an attachment base fixedly attached to said body toward said base end and having a baee flange and an attachment lip, said base flange extending laterally outward from said body sidewall and being mountable in juxtaposition with the valve flange, and said lip being attached to said baee flange and projecting generally away from the valve flange, said lip extending at least partially around the perimeter of said body sidewall and being spaced apart from said body sidewall to define a space therebetween opening in a direction qenerally away from the valve flange;

providing a plurality of clips, each said clip having a clip body and a clip arm, said clip body having an aperture therethrough for alignment with one of the attachment bolt holes in the valve flange, said apterture being sized for receiving one of the bolts for attachment of said clip body to the valve flange against movement, said clip arm being attached to said clip body toward an end portion thereof positioned away from the valve flange at a distance sufficient to extend over an end portion of said lip, said clip arm having a length to extend from said clip body laterally inward toward said body sidewall and having a finger protect away from said clip arm for positioning in said space between said lip and said body sidewall in engagement with a laterally inward wall of said lip, said finger being disconnected from said lip, said space being unobstructed along a sufficiently long portion thereof extending around the perimeter of said body sidewall to permit substantially uninhibited adjustable rotation of said body relative to the valve for setting the rotational end limits of said output drive member, further providing said clip body with at least one engagement member extending through an inward wall of said clip body toward said lip and being adjustably extendable toward eaid lip to lockably grasp said lip between said engagement member and said finger for preventing rotational movement of said body on the valve flange during powered operation of the actuator;

positioning a plurality of said clip in spaced apart position around said actuator body with said clip bodies laterally outward of said lip with said fingers positioned in said space between said lip and said body sidewall and with one of the attachment bolts in each of said apertures;

partially tightening at least a plurality of the bolts in said apertures;

selectively and adjustably rotating said body to set the rotational end limits of said output drive member relative to the valve;

tightening the bolts in said apertures to securely attach said body to the valve flange; and extending said engagement members of said clips to grasp said lip between said engagement member and said finger to prevent rotation of said body relative to the valve during powered operation of the actuator.

* * * * *